US011222637B2

(12) United States Patent
Mirelmann et al.

(10) Patent No.: US 11,222,637 B2
(45) Date of Patent: Jan. 11, 2022

(54) PERFORMING SUBTASK(S) FOR A PREDICTED ACTION IN RESPONSE TO A SEPARATE USER INTERACTION WITH AN AUTOMATED ASSISTANT PRIOR TO PERFORMANCE OF THE PREDICTED ACTION

(71) Applicant: Google LLC, Mountain View, CA (US)

(72) Inventors: Lucas Mirelmann, Zurich (CH); Zaheed Sabur, Baar (CH); Bohdan Vlasyuk, Zurich (CH); Marie Patriarche Bledowski, Richterswil (CH); Sergey Nazarov, Zurich (CH); Denis Burakov, Zurich (CH); Behshad Behzadi, Freienbach (CH); Michael Golikov, Merlischachen (CH); Steve Cheng, Los Altos, CA (US); Daniel Cotting, Islisberg (CH); Mario Bertschler, Zurich (CH)

(73) Assignee: GOOGLE LLC, Mountain View, CA (US)

( * ) Notice: Subject to any disclaimer, the term of this patent is extended or adjusted under 35 U.S.C. 154(b) by 111 days.

(21) Appl. No.: 16/613,705

(22) PCT Filed: May 31, 2019

(86) PCT No.: PCT/US2019/034937
§ 371 (c)(1),
(2) Date: Nov. 14, 2019

(87) PCT Pub. No.: WO2020/226667
PCT Pub. Date: Nov. 12, 2020

(65) Prior Publication Data
US 2020/0357395 A1 Nov. 12, 2020

Related U.S. Application Data

(60) Provisional application No. 62/843,900, filed on May 6, 2019.

(51) Int. Cl.
*G10L 15/22* (2006.01)
*G10L 15/08* (2006.01)

(52) U.S. Cl.
CPC ............ *G10L 15/22* (2013.01); *G10L 15/083* (2013.01)

(58) Field of Classification Search
CPC ......... G10L 15/22; G10L 15/083; G06F 3/16; G06F 40/174; G06F 40/216; G06F 40/40; G06F 40/35; G06N 20/00; G06N 7/005
(Continued)

(56) References Cited

U.S. PATENT DOCUMENTS 10,356,200 B2 * 7/2019 Zhang ..................... H04L 67/04
10,466,978 B1 * 11/2019 Vidan .................... G06N 20/00
(Continued)

FOREIGN PATENT DOCUMENTS

CN 107783801 3/2018
WO 2018125276 7/2018

OTHER PUBLICATIONS

European Patent Office; International Search Report and Written Opinion of Ser. No. PCT/US2019/034937; 17 pages dated Feb. 6, 2020.

*Primary Examiner* — Susan I McFadden
(74) *Attorney, Agent, or Firm* — Middleton Reutlinger

(57) ABSTRACT

Implementations herein relate to pre-caching data, corresponding to predicted interactions between a user and an automated assistant, using data characterizing previous interactions between the user and the automated assistant. An interaction can be predicted based on details of a current interaction between the user and an automated assistant. One or more predicted interactions can be initialized, and/or any corresponding data pre-cached, prior to the user commanding the automated assistant in furtherance of the predicted
(Continued)

interaction. Interaction predictions can be generated using a user-parameterized machine learning model, which can be used when processing input(s) that characterize a recent user interaction with the automated assistant. Should the user command the automated assistant in a way that is aligned with a pre-cached, predicted interaction, the automated assistant will exhibit instant fulfillment of the command, thereby eliminating any latency that the user would have otherwise experienced interacting with the automated assistant.

20 Claims, 9 Drawing Sheets

(58) Field of Classification Search
 USPC .................................................. 704/270.1
 See application file for complete search history.

(56) References Cited

U.S. PATENT DOCUMENTS

| | | | |
|---|---|---|---|
| 10,546,023 B2 * | 1/2020 | Ni | G06F 40/216 |
| 10,560,546 B2 * | 2/2020 | Zhang | H04L 67/04 |
| 10,592,195 B2 * | 3/2020 | Kreiner | G06F 3/1446 |
| 2007/0239637 A1 | 10/2007 | Paek et al. | |

* cited by examiner

PERFORMING SUBTASK(S) FOR A PREDICTED ACTION IN RESPONSE TO A SEPARATE USER INTERACTION WITH AN AUTOMATED ASSISTANT PRIOR TO PERFORMANCE OF THE PREDICTED ACTION

BACKGROUND

Humans may engage in human-to-computer dialogs with interactive software applications referred to herein as "automated assistants" (also referred to as "digital agents," "chatbots," "interactive personal assistants," "intelligent personal assistants," "assistant applications," "conversational agents," etc.). For example, humans (which when they interact with automated assistants may be referred to as "users") may provide commands and/or requests to an automated assistant using spoken natural language input (i.e. utterances), which may in some cases be converted into text and then processed, and/or by providing textual (e.g., typed) natural language input. An automated assistant responds to a request by providing responsive user interface output, which can include audible and/or visual user interface output.

In many cases, a user providing a spoken utterance is an exclusive action for causing an automated assistant to perform various actions. However, extensive computational and/or network resources can be utilized in processing spoken utterances, thereby leading to latency with respect to the automated assistant completing certain actions. For instance, an automated assistant action of turning on a smart light can be accomplished by transmitting a corresponding command to the smart light directly, or to a third-party server that processes the command, then transmits a corresponding command to the smart light. However, in performing such an action in response to a spoken utterance of "Assistant, turn on smart light X", speech-to-text processing is typically performed on audio data that embodies the spoken utterance, natural language processing is performed based on the resulting text, and then the corresponding command is determined and/or executed. Furthermore, in circumstances where speech-to-text and/or natural language processing is performed remotely, audio data and/or other data will need to be transmitted over one or more networks. As a result, a device and/or an application to which a spoken utterance is directed would not be responsive to any corresponding command until the spoken utterance is processed and/or interpreted, thereby causing the automated assistant, as well as the device and/or the application, to exhibit latency.

SUMMARY

Implementations set forth herein relate to predicting one or more actions that a user will request an automated assistant to perform, and initializing performance of one or more subtasks of each predicted action. By initializing performance of the one or more subtasks, latency can be mitigated when a user subsequently requests performance of a predicted action. A set of predicted actions can be generated in response to a user providing an input to an automated assistant, such as, when a user is attempting to control a home automation device. For example, in response to a user providing a spoken utterance that directs the automated assistant to adjust a setting of a light, a computing device that received the spoken utterance can cause one or more action predictions to be generated based on these spoken utterances. Furthermore, the computing device can act in furtherance of completing one or more subtasks of each action of the one or more predicted actions.

A subtask of a particular predicted action can include any tasks and/or other operations that would otherwise be completed during performance of the particular predicted action. When a predicted action corresponds to a request for the computing device to initialize a media stream, a subtask of the predicted action can include establishing a connection between the computing device and a host device that streams media data. For example, in response to a user requesting that the automated assistant turn on house lights in the morning, the automated assistant can predict one or more actions that will be subsequently initialized by the user, and those predicted actions can include the media playback action. As a result, should the user subsequently request performance of the media playback action, latency between requesting the media playback action and the media being rendered can be mitigated. In addition to the benefit of latency mitigation itself, mitigating latency further shortens the overall duration of the user/automated assistant interaction, which directly lessens the duration of screen-on time and/or other resource intensive processes during the interaction.

In some implementations, selection of one or more subtasks to retrieve data for and/or perform can be based on an estimated computational obligation of a particular subtask and/or an action that corresponds to the subtask. Furthermore, an amount of time that any data for advancing a predicted action will be cached can be based on the estimated computational obligation for the predicted action and/or one or more corresponding subtasks. For example, a subtask and/or a predicted action can be identified based on whether an estimated computational obligation for the subtask and/or the predicted action reaches and/or exceeds a particular estimated computational obligation threshold. Additionally, or alternatively, when action advancement data for a particular subtask and/or a predicted action is retrieved, the amount of time that the action advancement data is cached can be for a period of X seconds when the estimated computational obligation is Y, and a period of M seconds when the estimated computational obligation is N, where X is greater than Y, and M is greater than N. In some instances, the estimated computational obligation comprises an estimated time period for the computing device to complete performance of the subtask and/or the predicted action. The amount of time for which the action advancement data is cached and/or, for example, a network (e.g. HTTP) connection between the computing device and another remote device (e.g. a server) is held open in readiness of facilitating performance of the predicted action, may be related to the estimated time period for completion of the subtask. A longer estimated time period for completing the subtask may lead directly to a longer time for which the action advancement data is cached and/or, for example, a network (e.g. HTTP) connection between the computing device and another remote device (e.g. a server) is held open.

In these and other manners, various disclosed techniques for mitigating latency can be dynamically adjusted in view of computational obligation, to increase the likelihood of latency being mitigated for computationally burdensome subtasks and/or actions.

Additionally, or alternatively, a number of predicted actions can be limited by a static or dynamic threshold for predicted actions. In some implementations, the number of predicted actions and/or performed subtasks that can be predicted for a user can be limited by a static threshold that limits the number of predicted actions and/or performed subtasks to a total number (e.g., 3, 5, and/or any other number). In some implementations, the number of predicted actions and/or performed subtasks that are predicted for a user can be limited dynamically by a dynamic threshold. A value for the dynamic threshold can be selected by the computing device and/or the automated assistant based on one or more estimated computational obligations for one or more respective subtasks, predicted actions, previously requested actions, and/or any other information from which to base a selection of a threshold.

In some implementations, a variety of different types of actions can be predicted in response to a user providing an input to the automated assistant. A trained machine learning model can be used when determining the type(s) of action(s) to predict in response to such inputs to the automated assistant. The trained machine learning model can be used to process the input in order to generate the predicted actions, and optionally generate a corresponding probability for each action. A probability for a predicted action can characterize a likelihood that the user will direct the automated assistant to initialize performance of the predicted action. When the user requests that a predicted action be performed, the trained machine learning model can optionally be modified to reflect the confirmed prediction. Alternatively, or additionally, when the user bypasses requesting a predicted action within a threshold period of time, the trained machine learning model can optionally be modified to reflect the incorrectly predicted action.

Modifying the trained machine learning model can include generating a semi-supervised training example with label(s) based on which predicted action(s) the user requested and/or bypassed, and updating parameters of the machine learning model based on a gradient determined using the semi-supervised training example. As one non-limiting example, assume the trained machine learning model is utilized to generate output that includes a corresponding probability for each of N actions. N is an integer, such as 100 or other whole number. Further assume the trained machine learning model is used to generate, based on recently performed action(s) and/or attribute(s) of the user, a set of probabilities for the N actions. If the user then requests performance of one of the N actions, a semi-supervised training example can be generated that includes labeled output with a "1" probability for that action, and a "0" probability for all other actions. A gradient can then be determined based on comparing the labeled output to the set of probabilities. On the other hand, if the user does not request performance of any of the N actions, a semi-supervised training example can be generated that includes labeled output with a "0" probability for all actions. A gradient can then be determined based on comparing the labeled output to the set of probabilities. In both situations, the trained machine learning model can be modified based on the generated gradient. For example, the trained machine learning model can be modified locally at the client device of the user based on the generated gradient, and/or the generated gradient can be transmitted to a remote server device that modifies the trained machine learning model based on that gradient and other gradients from other client devices (i.e., federated learning as described below).

As mentioned above, in some implementations federated learning can be employed to train the machine learning model, at least when a variety of different users are interacting with their respective automated assistants, and confirming or bypassing certain predicted actions. The machine learning model that is trained according to such interactions can be used to subsequently process inputs, generate predictions about actions that the user will subsequently request, make decisions about subtasks to perform, and/or cache action advancement data for any respective predicted actions. For example, each client device that provides access to an automated assistant can generate one or more gradients over time and according to interactions between the user and the automated assistant (e.g., through the use of semi-supervised training examples based on the user confirming or bypassing predicted actions). Gradients for multiple client devices and/or users can be transmitted, with permission from corresponding users, with a server device that is in communication with the multiple client devices. The server device can use the model gradients to modify a trained machine learning model, which can be updated accordingly and shared with the client devices. As a result, a client device and/or automated assistant that a particular user interacts with can be trained according to interactions between that user and their automated assistant, as well as interactions between multiple other users and their respective automated assistants. In addition to preserving privacy of user data (since the transmitted gradients do not directly indicate the semi-supervised training examples utilized in generating the gradients), transmitting the gradients consumes less network bandwidth than transmitting the semi-supervised training examples (since the gradients are more data efficient than the semi-supervised training examples).

The above description is provided as an overview of some implementations of the present disclosure. Further description of those implementations, and other implementations, are described in more detail below.

Other implementations may include a non-transitory computer readable storage medium storing instructions executable by one or more processors (e.g., central processing unit(s) (CPU(s)), graphics processing unit(s) (GPU(s)), and/or tensor processing unit(s) (TPU(s)) to perform a method such as one or more of the methods described above and/or elsewhere herein. Yet other implementations may include a system of one or more computers that include one or more processors operable to execute stored instructions to perform a method such as one or more of the methods described above and/or elsewhere herein. For example, various implementations include a mobile phone or other client device that includes an automated assistant client, and processor(s) operable to executed stored instructions to perform one or more method(s) described herein.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1A:
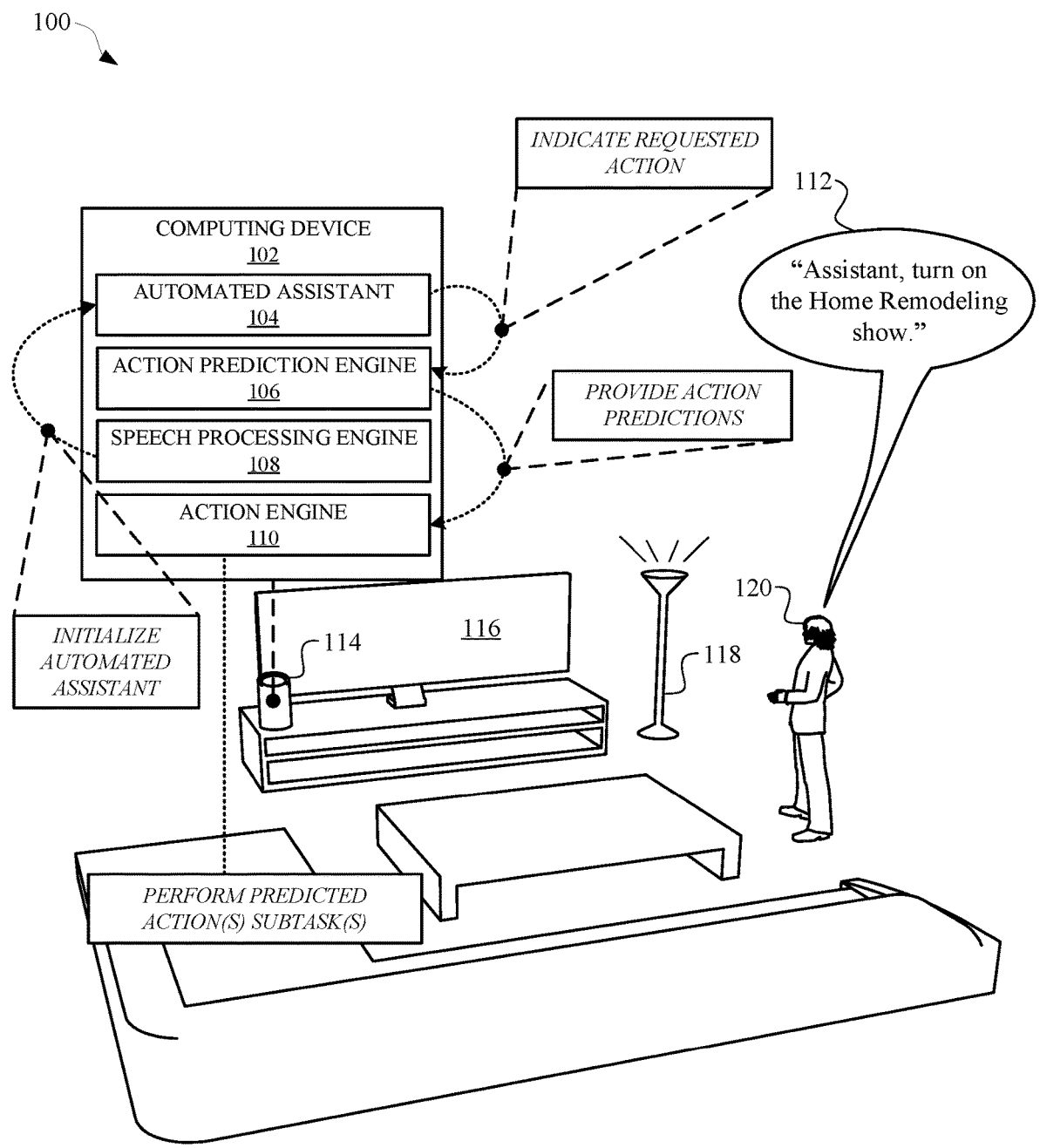
FIG. 1A and FIG. 1B illustrate views of an automated assistant performing predicted action subtasks in response to a request from a user.
Figure 1B:
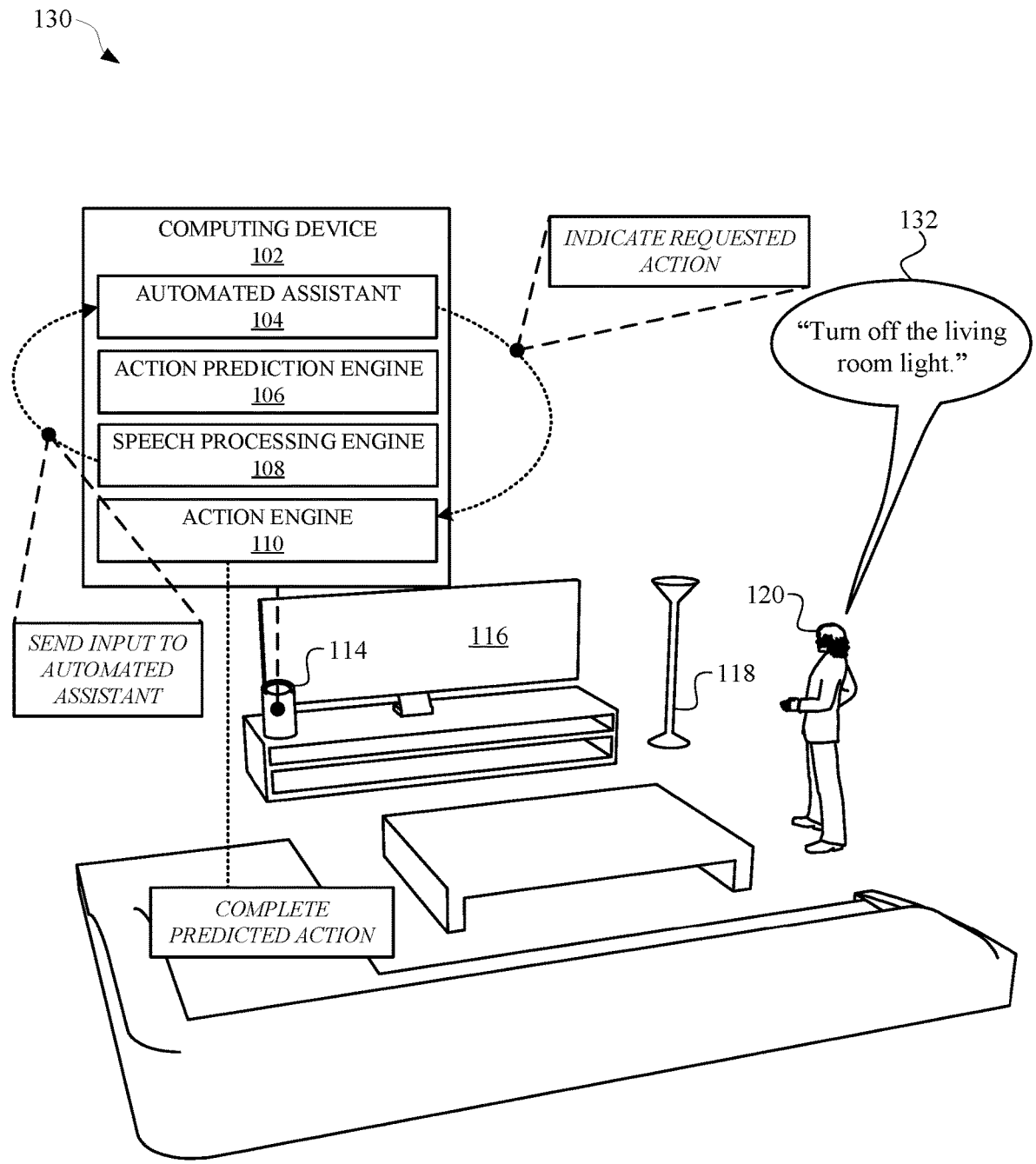

FIG. 1A and FIG. 1B illustrate a view 100 and a view 130, respectively, of an automated assistant 104 initializing and/or performing predicted action subtasks in response to a request from a user 120. The user 120 can provide the spoken utterance 112, which can embody a request to an automated assistant 104. The automated assistant 104 can be accessible via a computing device 102. Additionally, the computing device 102 can provide access to multiple different applications capable of performing the variety of different actions. In some implementations, the automated assistant 104 can be invoked in order to cause a third-party application to perform a particular action. In such instances, the automated assistant 104 can communicate with the third-party application directly and/or through an operating system of the computing device 102. An action performed by a third-party application can include one or more subtasks that are performed when executing the action.

In some implementations, the applications that are accessible via the computing device 102 can be used to control one or more other client devices. For example, the computing device 102 can be a standalone speaker device 114, which can be connected to a local area network with a smart television 116 and a smart light 118. The smart television 116 can be a television that includes a computing device capable of connecting to the local area network, and the smart light 118 can also include a computing device capable of connecting to the local area network. In order to mitigate wasteful latency that can be exhibited in response to some requests from the user 120, the computing device 102 can generate action predictions regarding actions that the user 120 may request, and thereafter, the computing device 102 can perform one or more subtasks for one or more of the corresponding predicted actions.

For example, the user 120 can provide, to the computing device 102, a spoken utterance 112 such as, "Assistant, turn on the home remodeling show." In response to the automated assistant 104 receiving the spoken utterance 112, the automated assistant 104 can process data characterizing the spoken utterance 112 in order to identify an action that has been requested by the user 120. The automated assistant 104 can identify the requested action using speech-to-text processing and/or natural language understanding processing, which can be performed on-device, at the computing device 102. The requested action can be, for example, a "turn on television" action in which the automated assistant 104 causes the smart television 116 to turn on and render data corresponding to a particular show requested by the user 120.

In some implementations, the computing device 102 can employ an action prediction engine 106, which can receive one or more inputs for generating one or more action predictions. For example, a requested action can be characterized by input data that is provided to the action prediction engine 106. The action prediction engine 106 can receive an indication of a requested action, and generate one or more action predictions based on the requested action. In some implementations, the one or more action predictions can identify one or more predicted actions that the user has previously requested performance of before or after requesting performance of the requested action. Alternatively, or additionally, the one or more action predictions can identify actions based on data that characterizes historical interactions between the user 120 and the automated assistant 104. Alternatively, or additionally, the one or more action predictions can identify actions based on other data that characterizes historical interactions between one or more other users and other instances of the automated assistant 104. For example, the user 120, and/or one or more other users, can have a history of requesting their lights be turned off shortly after requesting that their television be turned on.

In some implementations, the action predictions can be generated by the action prediction engine 106 based on the requested action and/or contextual data that characterizes a context in which the user provided the spoken utterance 112. For example, the user 120 may have provided the spoken utterance 112 at night, which is when they typically ask for their smart light 118 to be turned off. However in the mornings, when the user 120 requests that the smart television 116 be turned on, the user 120 does not request the automated assistant 104 to turn off the smart light 118. Therefore, because the user 120 has provided the spoken utterance 112 in the evening, the action prediction engine 106 can identify at least one predicted action as being an action for turning off the smart light 118.

One or more action predictions generated by the action prediction engine 106 can be provided to an action engine 110, which can use the one or more action predictions to identify subtasks. The identified subtasks can be performed prior to the user 120 providing a subsequent request that is related to the one or more predicted actions. For example, the action engine 110 can determine that the action for turning off the smart light 118 includes one or more subtasks such as communicating with a third-party server associated with the smart light 118, obtaining network data for establishing a local connection between the computing device 102 and the smart light 118, and/or generating a request to be transmitted to the smart light 118 over the network connection. One or more of the subtasks for the action of turning off the smart light 118 can be performed, and any subtask data collected during performance of the subtasks can be cached for a period of time.

In some implementations, the action prediction engine 106 can generate multiple different action predictions, as well as a probability for each action prediction of the action predictions. For example, in response to the user 120 providing the spoken utterance 112, the action engine 110 can be notified of the requested action, and generate multiple action predictions in response. Each generated action prediction can be provided with a probability that the user 120 will subsequently request that respective action. In some implementations, a probability for a predicted action can be generated by processing one or more inputs using a trained machine learning model. The trained machine learning model can be updated as the user 120 interacts with the automated assistant 104. Moreover, when the user requests a predicted action, a trained machine learning model can be updated based on the user 120 affirming the predicted action. Additionally, or alternatively, the trained machine learning model can be updated based on the user 120 not affirming a predicted action but, rather, requesting a different action from the predicted action.

In some implementations, subtasks for one or more predicted actions, having probabilities that are higher than one or more other predicted actions, can be initialized and/or performed in response to the spoken utterance. Additionally, or alternatively, a computational obligation for each predicted action and/or, for one or more subtasks of each predicted action, can be determined. A computational obligation can characterize an amount of processing, network bandwidth, memory usage, and/or any other computational resource that may be consumed during performance of a subtask and/or a predicted action. In some implementations, the predicted actions can be prioritized according to their corresponding computational obligation in order to determine whether to perform one or more subtasks of a respective predicted action. Alternatively, or additionally, the predicted actions that are being considered for performance prior to a request from a user can be based on whether a computational obligation for a respective predicted action satisfies a computational obligation threshold. In this way, predicted actions that do not satisfy a computational obligation threshold can be left out of the ranking for pre-initialization, because the benefits of pre-initializing such predicted actions may not be effectuated or otherwise apparent to a user because of the minor amount of computational resources necessary to perform the predicted action. However, when a computational obligation for a predicted action satisfies a computational obligation threshold, the predicted action can be prioritized and/or ranked with other predicted actions based on a probability that the predicted action will be requested by the user.

FIG. 1B illustrates a view 130 of the user 120 providing a spoken utterance 132 subsequent to one or more subtasks being performed for one or more predicted actions. For example, one or more subtasks can include retrieving network data from a third-party server device for establishing a communication channel between the computing device 102 and the smart light 118. In some implementations, the one or more subtasks can include establishing the communication channel between the computing device 102 and the smart light 118, and generating a request for turning off the smart light 118. In this way, latency that would otherwise be exhibited in response to the spoken utterance 132 can be mitigated.

For example, in response to the user 120 providing the spoken utterance 132, the automated assistant 104 can indicate, to the action engine 110, the requested action of turning off the smart light 118. Because the one or more subtasks for turning off the smart light 118 have been previously performed, there will be less subtasks to be performed in order to complete the requested action. For example, in order to complete the requested action of turning off the smart light 118, the action engine 110 can cause the previously generated request to be transmitted from the computing device 102 to the smart light 118. From a perspective of the computing device 102, as well as the user 120, wasteful latency that would otherwise be exhibited in response to the spoken utterance 132 would be mitigated by performing various subtasks prior to the user 120 providing the spoken utterance 132.

In some implementations, the action prediction engine 106 can generate one or more general action predictions corresponding to one or more types of actions such as, but not limited to, a music stream action, a video play action, a messaging application, a phone call action, and or any other type of action that can be performed by a computing device. However, other contextual data can be used to create more specificity for the types of actions being predicted. For example, when the action prediction engine 106 identifies a "stream music" action as a predicted action, the action prediction engine 106 can further detail the predicted action for the action engine 110 by accessing contextual data associated with the user that provided an initial request that caused the action prediction engine 106 to generate the predicted action.

For instance, if the contextual data indicates that a first user provided the initial request, the action prediction engine 106 can identify a playlist to stream via the "stream music" action and/or a first streaming service for performing the "stream music" action. However, if the contextual data indicates that a second user provided the initial request, the action prediction engine 106 can identify a different playlist to stream via the "stream music" action and/or a second streaming service (different from the first streaming service) for performing the "stream music" action. Identifying the first application for the first user can be based on the contextual data for the first user indicating that the first streaming service is utilized most frequently (or even exclusively) by the first user for "stream music" actions. Likewise, identifying the second streaming service for the second user can be based on contextual data for the second user indicating that the second streaming service is utilized most frequently (or even exclusively) by the second user for "stream music" actions. Accordingly, the action prediction engine 106 can first generate general action prediction(s), optionally utilizing a machine learning model trained using semi-supervised training examples labelled based on the general action predictions that correspond to the more specific actions actually performed. Further, the action prediction engine 106 can utilize the contextual data to determine more specific action(s) so that action advancement data can be generated, and/or subtask(s) performed, that are tailored to those more specific action(s). For example, a connection to the first streaming service can be initiated for the first user, whereas a connection to the second streaming service is instead initiated of the second user. In these and other manners, a trained machine learning model utilized by the action prediction engine 106 can be compact (and efficiently stored and utilized on client devices) and/or can be efficiently trained through utilization of the general action predictions. However, the action prediction engine 106 can still utilize contextual data to refine the general action predictions to more specific action prediction(s) and generate particularized advancement data and/or preform particularized subtask(s). Although the preceding instances describe identifying a single streaming service for a given user, in some situations multiple streaming services can be identified for a given user based on contextual data indicating that, for the given user, each of the multiple streaming services is utilized with at least a threshold frequency. Advancement data can be generated for each and/or subtask(s) performed for each. The remainder of the subtask(s) can then be performed for only one, optionally dependent on the further user input. For example, the remainder of the subtask(s) can be performed for a given streaming service based on the further user input identifying the given streaming service.

Figure 2A:
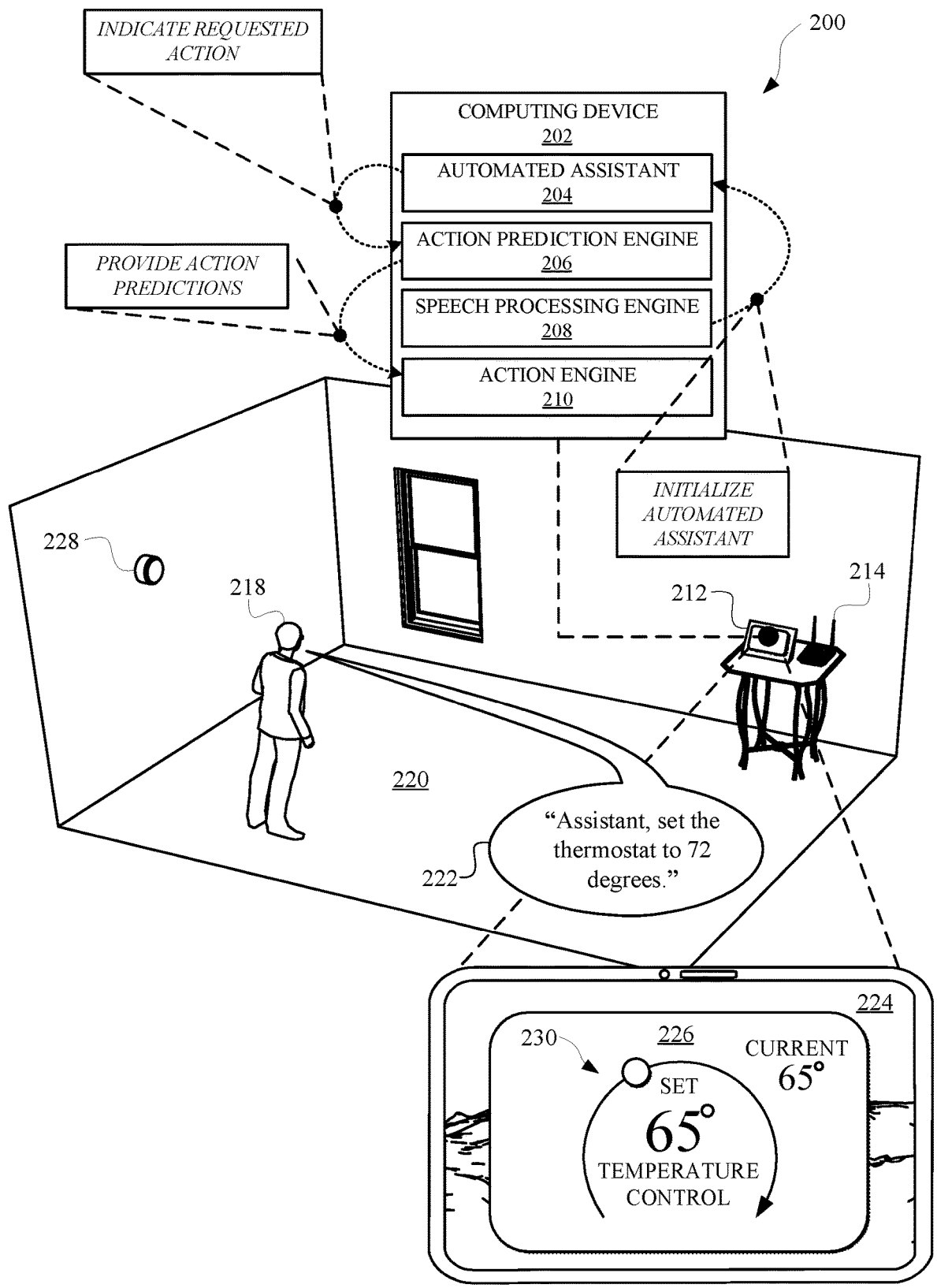
FIG. 2A, FIG. 2B, and FIG. 2C illustrate views of one or more subtasks of a predicted action being performed prior to a user requesting performance of the predicted action.
Figure 2B:
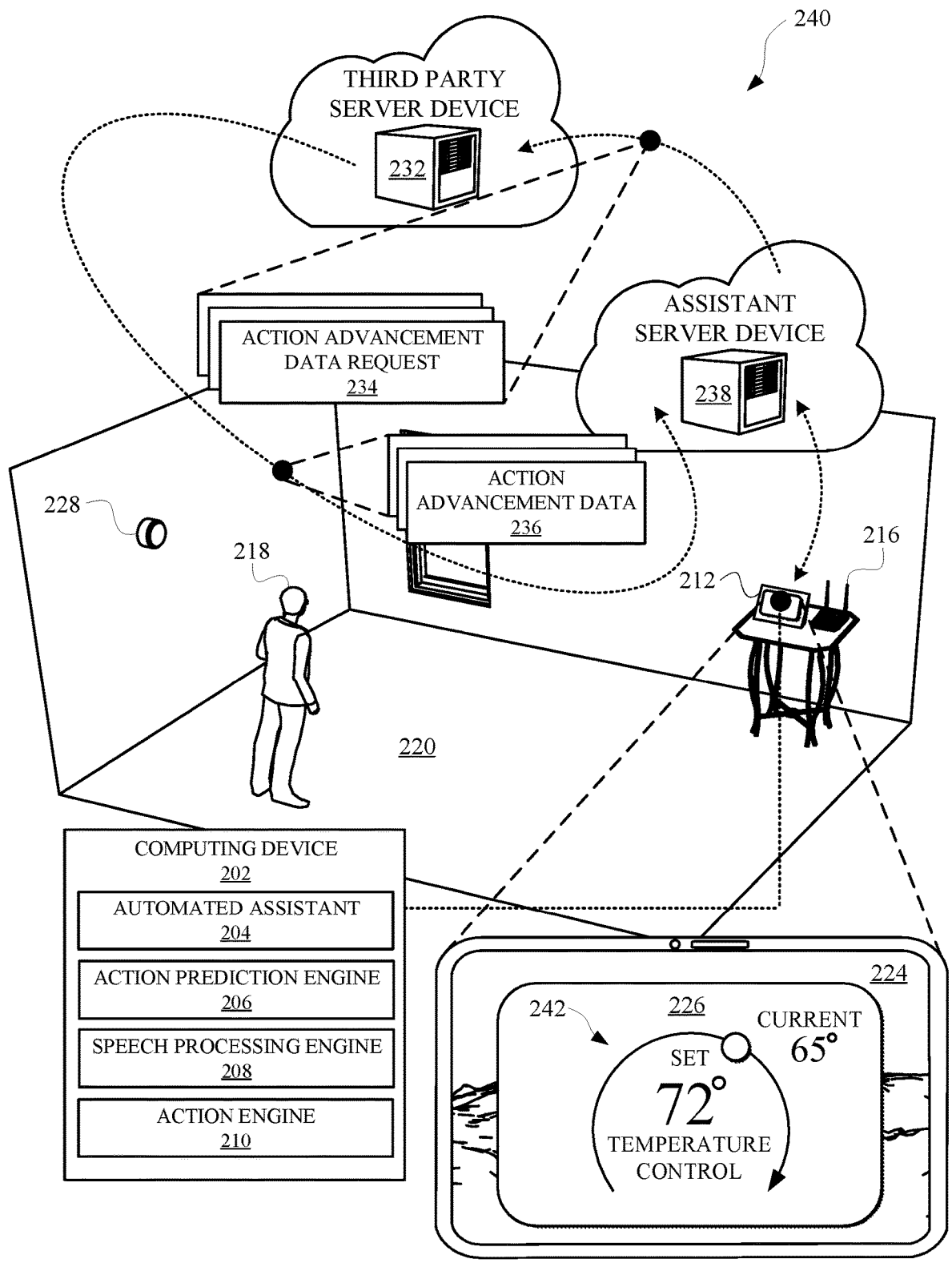
Figure 2C:
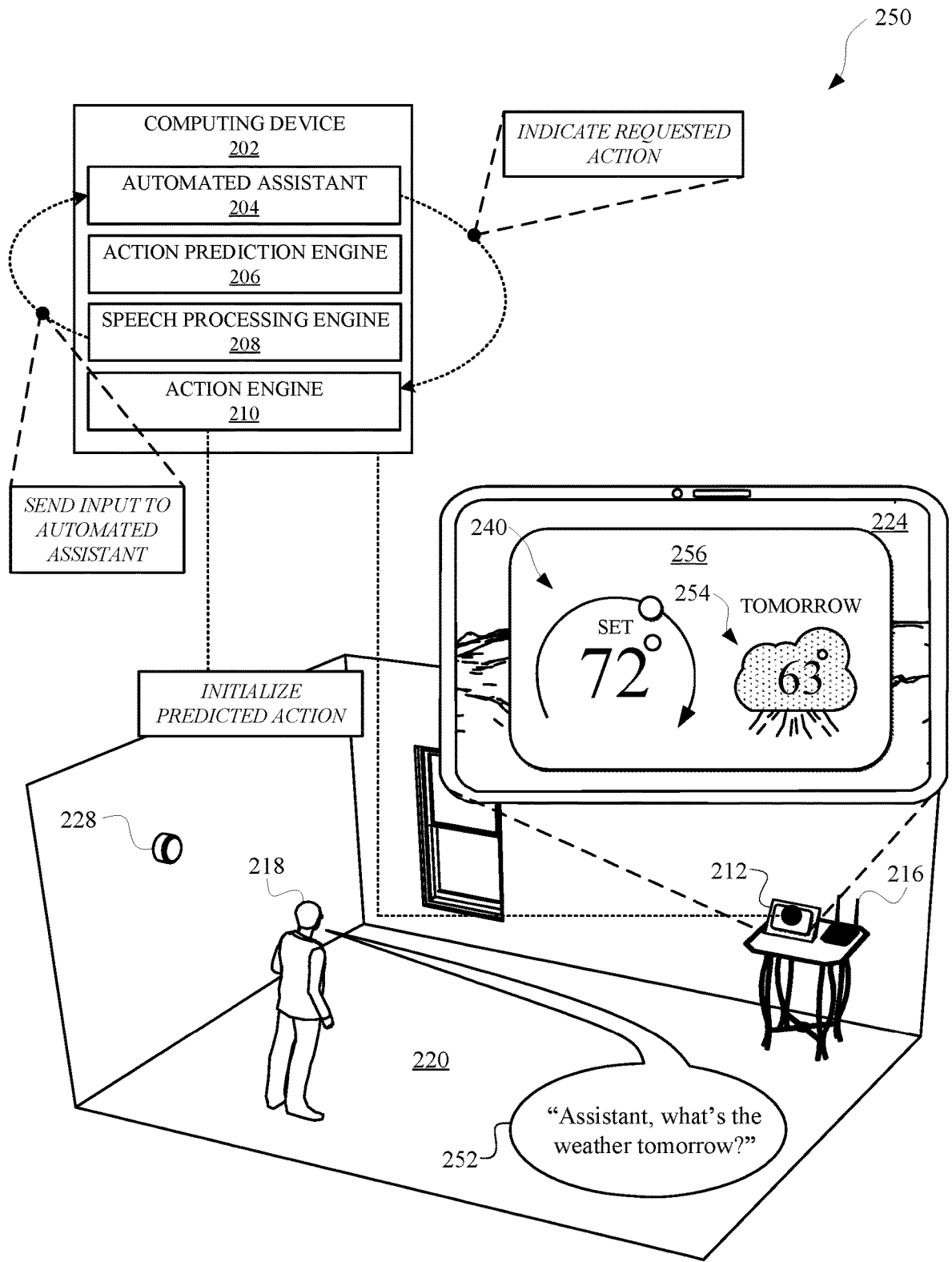

FIG. 2A, FIG. 2B, and FIG. 2C illustrate a view 200, a view 240, and a view 250, respectively, of one or more subtasks of a predicted action being performed prior to a user requesting performance of the predicted action. Specifically, the user 218 can initially provide a spoken utterance 222 such as, "Assistant, set the thermostat 228 to 72." The spoken utterance 222 can be directed to an automated assistant 204 that is accessible via a computing device 202, such as a standalone display device 212. The computing device 202 can include a display panel 224, which can be used to render a graphical user interface 226 for controlling a third-party device, such as a thermostat 228. The graphical user interface 226 can include content such as a graphical control element 228 for adjusting one or more settings of the thermostat 228 via one or more touch gestures provided to the display panel 224.

In response to receiving the spoken utterance 222, the computing device 202 can process audio data characterizing the spoken utterance 222 at a speech processing engine 208. The speech processing engine 208 can process the audio data according to a speech-to-text process and/or a natural language understanding process. The speech processing engine 208 can determine that the spoken utterance 222 is directed at the automated assistant 204 and, in response, initialize the automated assistant 204 and/or otherwise provide an indication to the automated assistant 204 that a user 218 is invoking the automated assistant 204. The automated assistant 204 can access input data that is based on the spoken utterance 222, and/or the language processing, in order to identify one or more actions being requested by the user 218. When the automated assistant 204 has identified one or more actions being requested by the user 218, an indication of the requested actions can be provided to an action prediction engine 206. Furthermore, the automated assistant 204 can initialize performance of the one or more actions requested by the user 218.

The action prediction engine 206 can use the indication of the one or more requested actions in order to generate one or more action predictions. For example, the action prediction engine 206 can identify one or more actions that the user 218 typically requests within a period of time of requesting changes to settings of the thermostat 228. In some implementations, input to the action prediction engine 206 can be processed using one or more trained machine learning models, which can be trained according to a variety of different data. For example, data used to train a machine learning model employed by the action prediction engine 206 can include historical interaction data between the user 218 and the automated assistant 204, historical interaction data between one or more other users and one or more other instances of the automated assistant, contextual data characterizing pictures of a context in which the user provided the spoken utterance 222, operating features of the computing device 202, a location at the user 218 and/or the computing device 202, natural language content of the spoken utterance 222, network data characterizing properties of a local area network (e.g., a Wi-Fi network provided by a Wi-Fi router 214), and/or any other source of data that can be used to make predictions about actions that a user will request performance of. When the action prediction engine 206 has identified one or more predicted actions, the predicted actions can be indicated to an action engine 210.

FIG. 2B illustrates a view 240 of the requested action being performed at the computing device 202 and one or more subtasks of one or more predicted actions also being performed via the computing device 202. For example, the requested action can include modifying a setting of the thermostat 228 and reflecting the change to the setting at the graphical user interface 226. The setting of the thermostat 230 can change from 65 degrees to 72 degrees per the requested action, and an updated graphical control element 242 can be rendered to reflect the change to the thermostat setting. In some implementations, the action prediction engine 206 can predict, based on the requested action and/or any other data, that the user will request performance of one or more actions that include a weather forecast action. The weather forecast action can be predicted by the action prediction engine 206 and indicated to the action engine 210. The action engine 210 can receive the indication of the predicted action and identify one or more subtasks of the predicted action. In some implementations, a subtask can include accessing action advancement data, which can be used to further one or more other subtasks of a predicted action. For example, the predicted weather forecast action can include a subtask of retrieving weather forecast data, which can be rendered at the display panel 224.

When the action prediction engine 206 has made a prediction about the weather forecast action, and the action engine 210 has identified one or more subtasks of the predicted action, the computing device 202 can initialize performance of one or more subtasks. For instance, the automated assistant 204 can communicate with an assistant server device 238 to cause the assistant server device to transmit an action advancement data request 234 to a third party server device 232. The action advancement data request 234 can be provided to the third party server device 232 in order that the third party server device will provide weather forecast data. By performing this subtask prior to the user 218 requesting performance of the predicted action, wasteful latency can be mitigated from automated assistant interactions, thereby preserving computational resources that would otherwise be consumed by prolonging the interactions.

In response to the action advancement data request 234, the third party server device 232 can provide action advancement data 236 to the assistant server device 238. The assistant server device 238 can generate a command for the display panel 224, and/or cache the action advancement data 236 and/or the command for a period of time. In some implementations, the action advancement data 236 can include connection data and/or authentication data for communicating with one or more devices such as a server device and/or a client device. Alternatively, or additionally, the action advancement data 236 can include natural language content and/or graphical content for rendering at the display panel 224 in response to the user providing a subsequent request for the computing device 202 to render a weather forecast.

In some implementations, an amount of time that the action advancement data 236 and/or the command data is cached at the computing device 202 can be based on data that characterizes a computational obligation corresponding to the predicted action. In other words, an amount of processing, network consumption, and/or power that is estimated to be consumed during performance of the predicted action, when subtasks are not performed before the action is requested, can provide a basis for estimating the computational obligation. The period of time that the action advancement data 236 will be cached at the computing device 202 can be directly proportional or indirectly proportional to the estimated computational obligation of a predicted action. For example, when the action prediction engine 206 identifies a first predicted action and a second predicted action, and the first predicted action is estimated to have a larger computational obligation than that of second predicted action, the action advancement data corresponding to the first predicted action can be cached for a longer period of time than the second predicted action. In this way, memory resources at the computing device 202 can be leveraged when a predicted action may employ more computational resources than another predicted action that is estimated to consume less computational resources.

In some implementations, action advancement data can be cached even after a predicted action has been requested. For example, subtasks correlated to other actions that do not include the weather forecast action can also be performed prior to the user requesting the predicted action of viewing the weather forecast. For instance, a predicted action can include an "alarm on" action for securing alarm system of a home 220. The action advancement data 236 can include data for performing one or more subtasks related to the security alarm system. This action advancement data 236 can be cached before and/or after the user subsequently requests the weather forecast, even though the user 218 did not yet request the "alarm on" action. However, because a probability of the user requesting the "alarm on" action has caused the automated assistant 204 to anticipate the user 218 requesting the alarm on action, one or more subtasks of the "alarm on" action can be performed and/or initialized.

In some implementations, the action prediction engine 206 can limit a number of predicted actions to a static number or a dynamic number that is based on one or more properties of the computing device 202, the automated assistant 204 and/or any other data that can be associated with predicting actions performed at a computing device. For example, a threshold for a number of predicted actions at any given time can be directly proportional to an amount of available network bandwidth, processing bandwidth, and/or free memory. Therefore, as network bandwidth increases, a threshold number of predicted actions can increase, thereby allowing more subtasks to be performed ahead of the user 218 requesting actions corresponding to those subtasks.

FIG. 2C illustrates a view 250 of the user 218 providing a spoken utterance 252 to the automated assistant 204 in order to initialize performance of the weather forecast action. Specifically, the spoken utterance 252 can include, "Assistant what's the weather tomorrow?" The computing device 202 can receive the spoken utterance 252 and process audio corresponding to the spoken utterance 252. For example, a speech processing engine 208 of the computing device 202 can process the audio data corresponding to the spoken utterance 252, and thereafter provide input data to the automated assistant 204. The automated assistant 204 can then identify an action that the user 218 is requesting to be one of the predicted actions. The identified action can be indicated to the action engine 210, which can complete performance of the requested action.

For example, when the predicted action and the requested action are the weather forecast action, and the computing device 202 has cached command data and/or advancement data in furtherance of performing the weather forecast action, the computing device 202 can perform any remaining subtasks of the requested action. For instance, the computing device 202 can provide the cached command data to the display panel 224 in order to cause the display panel to render an updated graphical user interface 256, which can include another graphical element 254 characterizing at least a portion of the action advancement data 236. Therefore, in some implementations, the computing device 202 can cause the display panel 224 to simultaneously render data based on the requested action—as well as the predicted action. Content of the display panel 224 can be used to generate contextual data, which can be used to generate supplemental predicted actions in anticipation of the user 218 subsequently requesting more actions to be performed via the automated assistant 204. For example, in response to the user 218 requesting the weather forecast action, the action prediction engine 206 can predict (e.g., based on content of the display panel 224) that the user will request an "alarm on" action for securing an alarm system of the home 220. The action engine 210 can identify one or more subtasks of the alarm on action and initialize performance of those subtasks prior to the user providing another spoken utterance that is intended to be in furtherance of the "alarm on" action.

Figure 3:
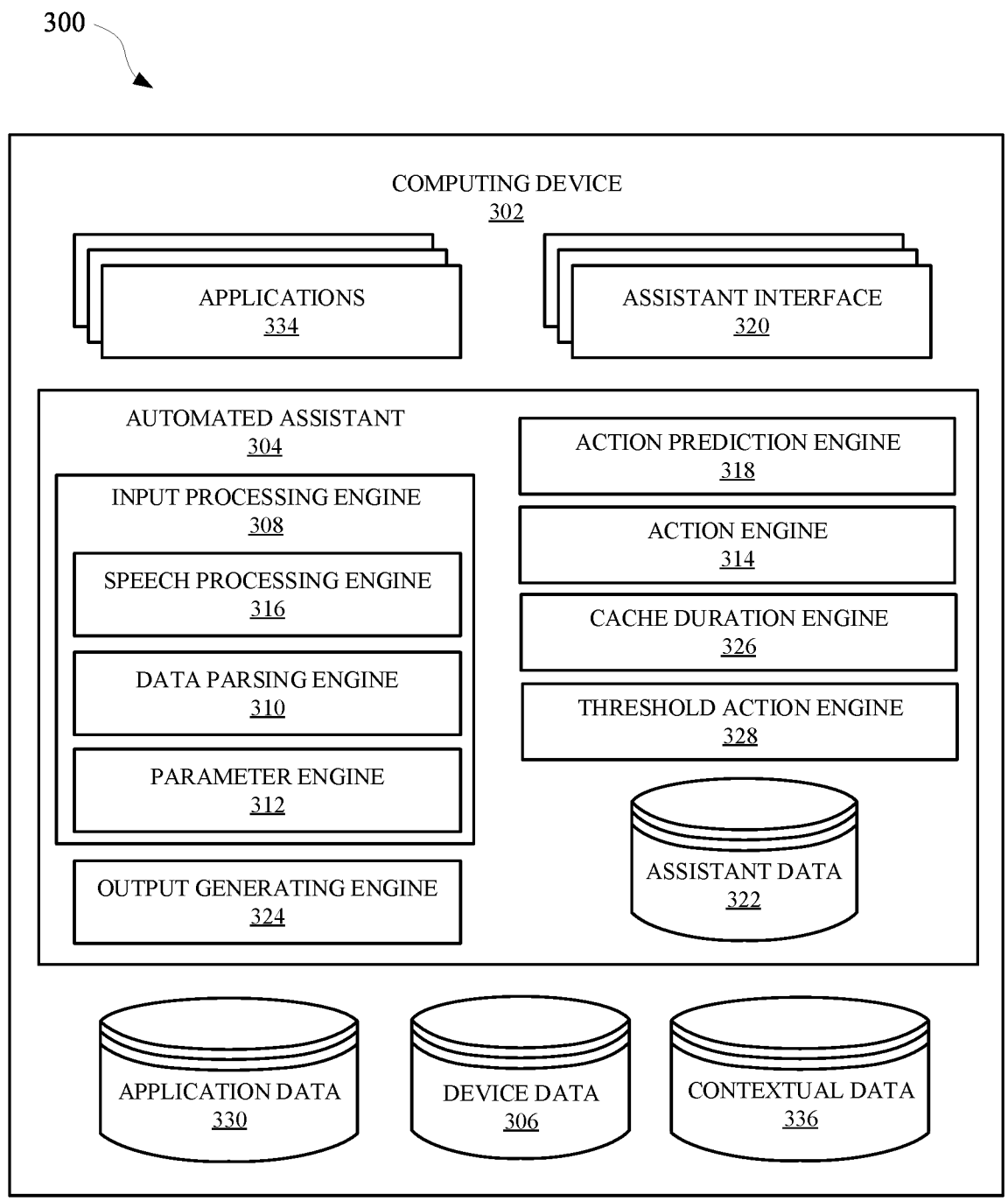
FIG. 3 illustrates a system for pre-caching data, corresponding to predicted interactions between a user and an automated assistant, using data characterizing previous interactions between the user and the automated assistant.

FIG. 3 illustrates a system 300 for pre-caching data, corresponding to predicted interactions between a user and an automated assistant, using data characterizing previous interactions between the user and the automated assistant. The automated assistant 304 can operate as part of an assistant application that is provided at one or more computing devices, such as a computing device 302 and/or a server device. A user can interact with the automated assistant 304 via an assistant interface 320, which can be a microphone, a camera, a touch screen display, a user interface, and/or any other apparatus capable of providing an interface between a user and an application. For instance, a user can initialize the automated assistant 304 by providing a verbal, textual, and/or a graphical input to an assistant interface 320 to cause the automated assistant 304 to perform a function (e.g., provide data, control a peripheral device, access an agent, generate an input and/or an output, etc.). The computing device 302 can include a display device, which can be a display panel that includes a touch interface for receiving touch inputs and/or gestures for allowing a user to control applications 334 of the computing device 302 via the touch interface. In some implementations, the computing device 302 can lack a display device, thereby providing an audible user interface output, without providing a graphical user interface output. Furthermore, the computing device 302 can provide a user interface, such as a microphone, for receiving spoken natural language inputs from a user. In some implementations, the computing device 302 can include a touch interface and can be void of a camera (or include a camera), but can optionally include one or more other sensors.

The computing device 302 and/or other third party client devices can be in communication with a server device over a network, such as the internet. Additionally, the computing device 302 and any other computing devices can be in communication with each other over a local area network (LAN), such as a Wi-Fi network. The computing device 302 can offload computational tasks to the server device in order to conserve computational resources at the computing device 302. For instance, the server device can host the automated assistant 304, and/or computing device 302 can transmit inputs received at one or more assistant interfaces 320 to the server device. However, in some implementations, the automated assistant 304 can be hosted at the computing device 302, and various processes that can be associated with automated assistant operations can be performed at the computing device 302.

In various implementations, all or less than all aspects of the automated assistant 304 can be implemented on the computing device 302. In some of those implementations, aspects of the automated assistant 304 are implemented via the computing device 302 and can interface with a server device, which can implement other aspects of the automated assistant 304. The server device can optionally serve a plurality of users and their associated assistant applications via multiple threads. In implementations where all or less than all aspects of the automated assistant 304 are implemented via computing device 302, the automated assistant 304 can be an application that is separate from an operating system of the computing device 302 (e.g., installed "on top" of the operating system)—or can alternatively be implemented directly by the operating system of the computing device 302 (e.g., considered an application of, but integral with, the operating system).

In some implementations, the automated assistant 304 can include an input processing engine 308, which can employ multiple different modules and/or engines for processing inputs and/or outputs for the computing device 302 and/or a server device. For instance, the input processing engine 308 can include a speech processing engine 316, which can process audio data received at an assistant interface 320 to identify the text embodied in the audio data. The audio data can be transmitted from, for example, the computing device 302 to the server device in order to preserve computational resources at the computing device 302. Additionally, or alternatively, the audio data can be processed at the computing device 302.

The process for converting the audio data to text can include a speech recognition algorithm, which can employ neural networks, and/or statistical models for identifying groups of audio data corresponding to words or phrases. The text converted from the audio data can be parsed by a data parsing engine 310 and made available to the automated assistant 304 as textual data that can be used to generate and/or identify command phrase(s), intent(s), action(s), slot value(s), and/or any other content specified by the user. In some implementations, output data provided by the data parsing engine 310 can be provided to a parameter engine 312 to determine whether the user provided an input that corresponds to a particular intent, action, and/or routine capable of being performed by the automated assistant 304 and/or an application or agent that is capable of being accessed via the automated assistant 304. For example, assistant data 322 can be stored at the server device and/or the computing device 302, and can include data that defines one or more actions capable of being performed by the automated assistant 304, as well as parameters necessary to perform the actions. The assistant data 322 generated via the input processing engine 308 can be processed by an output generating engine 324, in order to cause the automated assistant 304 to provide an output to the user via an assistant interface 320, and/or initialize one or more actions associated with one or more applications 334.

In some implementations, the computing device 302 can include one or more applications 334, which can be provided by a third-party entity that is different from an entity that provided the computing device 302 and/or the automated assistant 304. An action engine 314 of the automated assistant 304 and/or the computing device 302 can access application data 330 to determine one or more actions capable of being performed by one or more applications 334. Furthermore, the application data 330 and/or any other data (e.g., device data 306) can be accessed by the automated assistant 304 to generate contextual data 336, which can characterize a context in which a particular application 334 is executing at the computing device 302, and/or a context in which a particular user is accessing the automated assistant 304 and/or the computing device 302.

While one or more applications 334 are executing at the computing device 302, the device data 306 can characterize a current operating status of each application 334 executing at the computing device 302. Furthermore, the application data 330 can characterize one or more features of an executing application 334, such as content of one or more graphical user interfaces being rendered at the direction of one or more applications 334. In some implementations, the action engine 314 can initialize performance of one or more actions of an application 334 at the direction of the automated assistant 304.

In some applications, the system 300 can generate action predictions using an action prediction engine 318, which can receive input data from which to generate the action predictions. The input data can be received from the output generating engine 324, which can indicate one or more actions that the user has requested. For example, in response to a user requesting that a particular automated assistant routine be performed by the automated assistant 304, the action prediction engine 318 can receive an indication of the routine and/or the actions corresponding to the routine. In response to receiving this indication, the action prediction engine 318 can generate one or more action predictions characterizing one or more actions that the user or another user may subsequently request performance of. For example, the assistant data 322 can indicate that the user typically requests a particular "good night" routine at night, and shortly thereafter another user, such as a spouse of the user, typically requests a particular action be performed by the automated assistant 304, such as reminding the other user of their schedule for the following day. Therefore, the action prediction engine 318 can generate one or more action predictions in response to the routine being requested, and the one or more action predictions can characterize an action for rendering the following day's schedule.

The action prediction engine 318 can communicate the action predictions to the action engine 314, which can process data characterizing the action predictions and identify one or more subtasks for each action of the one or more predicted actions. For example, in response to receiving the data characterizing the predicted actions, the action engine 314 can identify one or more subtasks of each predicted action. For example, one or more subtasks of a predicted action can include, with prior permission from the user, accessing application data 330 that is associated with a calendar application of the applications 334. Alternatively, or additionally, the one or more subtasks can include generating graphical data characterizing the schedule of the user for the following day. The graphical data can be generated based on at least a portion of the application data 330 generated by the calendar application.

In some implementations, the action prediction engine 318 can limit a number of action predictions that are generated in response to an interaction between the user and the automated assistant 304. Alternatively, or additionally, the action engine 314 can limit a number of subtasks that will be performed and/or initialized prior to a user subsequently requesting a predicted action. A threshold for a number of action predictions, and/or a threshold for a number of subtasks to be performed, can be determined by a threshold action engine 328. In some implementations, one or more of the thresholds can be static or dynamic based on the assistant data 322, application data 330, device data 306, and/or contextual data 336. For example, a threshold number of action predictions and/or a threshold number of initialized subtasks can be based on available network bandwidth, available processing bandwidth, a location of the user, a number of users interacting with the computing device 302, predicted computational obligations of one or more predicted actions, predicted computational obligations of one or more subtasks, an estimated amount of available memory, the type of predicted action that is being predicted, and/or any other information from which a threshold can be determined.

When one or more action predictions have been determined and/or one or more subtasks have been performed, a cache duration engine 326 can determine amount of time with which to cache action advancement data that has been generated in furtherance of performing subtasks of one or more predicted actions. For example, the cache duration engine 326 can determine an amount of time to store the application data that has been accessed in furtherance of the predicted action of displaying the schedule for the following day for the other user. In some implementations, an amount of time that the action advancement data is cached can be static or dynamic based on the assistant data 322, application data 330, device data 306, and/or contextual data 336. For example, the amount of time that action advancement data is cached can be based on available network bandwidth, available processing bandwidth, a location of the user, a number of users interacting with the computing device 302, predicted computational obligations of one or more predicted actions, predicted computational obligations of one or more subtasks, an estimated amount of available memory, the type of predicted action that is being predicted, and/or any other information from which a cache duration can be determined.

Figure 4A:
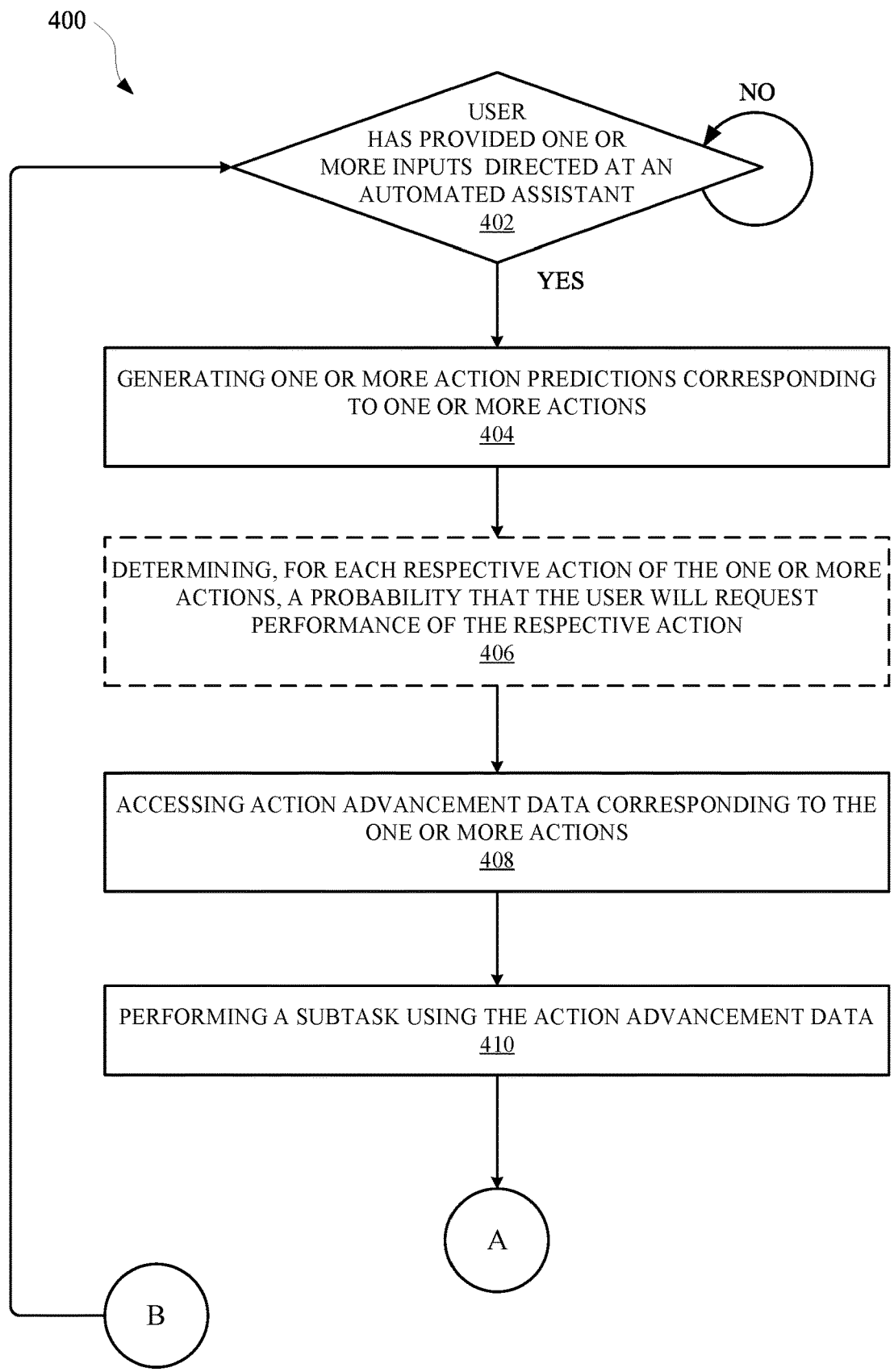
FIG. 4A and FIG. 4B illustrate a method(s) for mitigating latency, between a spoken utterance and performance of an action by an automated assistant, through the use of action predictions.
Figure 4B:
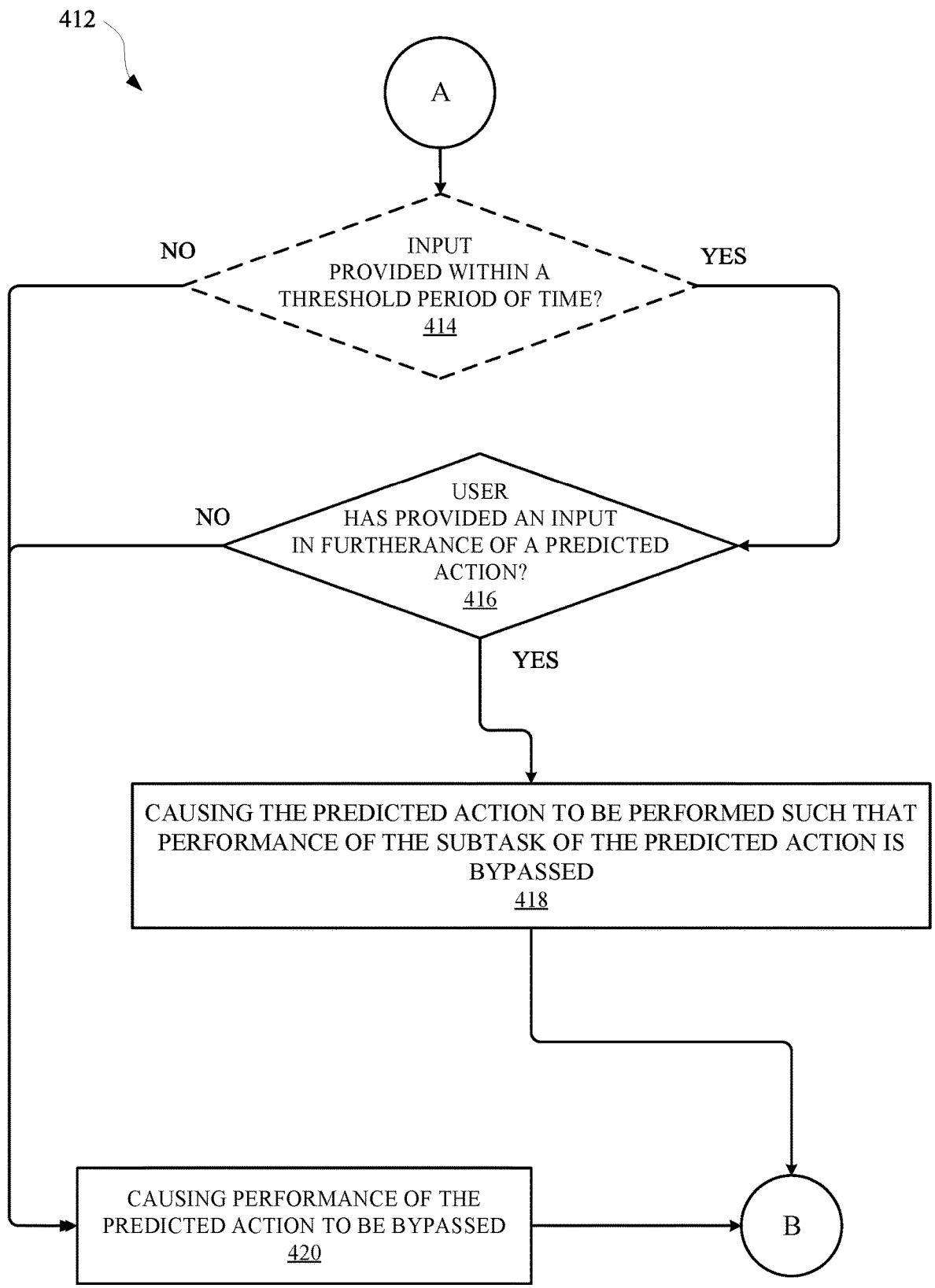

FIG. 4A and FIG. 4B illustrate a method 400 and a method 412 for eliminating latency between a spoken utterance and performance of an action by an automated assistant through the use of action predictions. Specifically, one or more action predictions can be identified, and one or more subtasks associated with those action predictions can be performed, prior to a user explicitly requesting one or more corresponding actions be performed. The method 400 can be performed by one or more computing devices, applications, and/or any other apparatus or module capable of performing a predicted action. The method 400 can include an operation 402 of determining whether a user has provided a spoken utterance directed at an automated assistant. The one or more inputs can include a spoken utterance, an invocation phrase, a gesture input, a touch input, and/or any other input that can be used to interact with an automated assistant. When the user is determined to have provided one or more inputs directed at the automated assistant, the method 400 can proceed from the operation 402 to an operation 404. However, if the user is determined to have not provided the one or more inputs, a computing device operating according to the method 400 can continue to monitor for the one or more inputs.

The operation 404 can include generating one or more action predictions corresponding to one or more actions. An action prediction can characterize a particular action of the one or more actions that the user is predicted to request, at least in view of the user having provided the one or more inputs. For example, the one or more inputs can include a spoken utterance such as, "Assistant, turn on my morning podcast." A computing device receiving the one or more inputs can determine that the one or more inputs are directed at an automated assistant, and generate one or more action predictions in response. The one or more action predictions can characterize one or more actions that the user is likely to subsequently request such as, but not limited to: requesting that the automated assistant turn on the lights in the kitchen, reading email messages, displaying the weather, and/or any other action that can be associated with an automated assistant.

The method 400 can include an optional operation 406 of determining, for each respective action of the one or more actions, a probability that the user will request performance of the respective action. Each probability can be generated using a trained machine learning model, which can be trained according to a variety of different processes. For example, the trained machine learning model can be trained using a federated learning system and/or process in which data that is based on interactions between other users and their respective automated assistants is employed during the training process. Alternatively, or additionally, the trained machine learning model can be a recurrent neural network model or a feed-forward neural network model. The neural network model can have as inputs, one or more actions that the user has requested (e.g., turning on the morning podcast), and optionally one or more attributes of the user and/or their computing device, and/or any other information that can be associated with the user and/or their respective computing device. One or more outputs of the recurrent neural network model can include one or more probability values, such that each probability value corresponds to a respective action identifier. In some implementations, these probability values can be the probabilities determined at the operation 406.

In some implementations, the attributes of the user and/or their computing device that are included as inputs and processed using the trained machine learning model can include metrics for the user for one or more particular types of actions. As one non-limiting example, metrics for the user can include a corresponding metric for each of the types of actions whose probabilities are predicted utilizing the trained machine learning model. Each of the metrics can be based on a quantity of performances, for a corresponding one of the types of actions, based on input from the user and/or at the computing device. Optionally, the performances can be performances that occurred within a threshold amount of time (e.g., within the last three months) and/or performances of more recent actions can be weighted more heavily than performances of less recent actions. As one particular example, assume a first user only employs the automated assistant to control their alarm system and stream music, and performs both of these actions in equal quantities. In such an example, these two types of actions can each be assigned a probability of 0.5, while all other types of actions would be assigned 0. As another example, if a second user only employs the automated assistant to watch movies, control lights, get directions, and see their schedule, and performs each of these actions in equal quantities—each of these types of actions can be assigned a probability of 0.25, while all other types of actions can be assigned 0. It is noted that, in such examples, the probabilities generated based on processing such metrics (along with action(s) the user has requested) will not conform strictly to the metrics in many (and perhaps all) situations. However, the probabilities will be influenced by the metrics of different users such that, for example, different probabilities will be generated for users A, B, and C that each have different metrics but have requested performance of the same action.

The method 400 can proceed from the operation 404 and/or the operation 406 to an operation 408. The operation 408 can include accessing action advancement data corresponding to the one or more predicted actions. The action advancement data can be any data that can be employed during performance of one or more subtasks of one or more predicted actions. For example, when a predicted action includes turning on the lights in the kitchen, the action advancement data can include any data that is useful for establishing a connection between the local computing device and the internet of things (IoT) kitchen lights. In some implementations, action advancement data can include a digital certificate and/or a digital token for authenticating and/or otherwise establishing the connection between the local computing device and the IoT kitchen lights. In some implementations, the action advancement data can include data for multiple different subtasks and/or multiple different predicted actions. For example, in addition to the data used for establishing the network connection, the action advancement data can include other data for a predicted action of displaying a morning weather report for the user. Therefore, this other data can include textual and/or graphical data characterizing a weather forecast for that day and/or subsequent days.

The method 400 can proceed from the operation 408 to the operation 410. The operation 410 can include performing one or more subtasks using the action advancement data. In some implementations, a subtask of a particular predicted action can use the action advancement data when performing the subtask. For example, the subtask can include generating a request for a separate client device to perform a particular operation, and the request can include information that is based on the action advancement data or otherwise include at least some of the action advancement data. For instance, when the subtask corresponds to an action for turning on the IoT kitchen lights, the subtask can include generating a request that will be received by the IoT kitchen lights and the request can embody a digital certificate or digital token characterized by the action advancement data. Alternatively, or additionally, the subtask can include caching data that will be rendered during performance of a corresponding predicted action—should the user request performance of the predicted action. For example, the subtask can include rendering graphical data that characterizes a weather forecast, and the graphical data can be generated based on some amount of data included in the action advancement data.

The method 400 can proceed from the operation 410 to an operation 414 of a method 412. The method 400 can continue to the method 412 via a continuation element "A," which can symbolize a continuation between the operation 410 and the operation 414. Specifically, as provided in FIG. 4B, the operation 414 can be an optional operation of determining whether the user provided an input within a threshold period of time. The threshold time can be a static period of time or a dynamic period of time. For example, the threshold period of time can be a static value such as "x" minutes, "y" seconds, and/or "z" milliseconds, where x, y, and/or z can be any time value. Alternatively, or additionally, the threshold period of time can be a dynamic value that is generated based on interactions between the user and the automated assistant, the one or more predicted actions, and/or any other information that can be associated with an automated assistant. For example, the threshold period of time can be based on an estimated computational obligation of a particular action of the one or more predicted actions. Additionally, or alternatively, the threshold period of time can be based on characteristics of previous interactions between the user and the automated assistant. When the user has not provided an input directed at the automated assistant within the threshold period of time, the method 400 can proceed from the operation 414 to an operation 420. However, when the user has provided an input directed at the automated assistant within the threshold period of time, the method 400 can proceed from the operation 414 to the operation 416.

The operation 414 can include determining whether the user has provided an input in furtherance of a predicted action. One or more processors of the computing device can be used to monitor for inputs to one or more interfaces of the computing device, and/or any other computing device that is in communication with the computing device. When an input is received, the input can be processed to determine whether the input corresponds to a predicted action of the one or more predicted actions. For example, when a predicted action includes turning on the IoT kitchen lights and the user provides a spoken utterance such as, "Assistant, start my car," the automated assistant can determine that the spoken utterance was not in furtherance of a predicted action. Therefore, the method 412 can proceed from the operation 416 to the operation 420. The operation 420 can include causing performance of the predicted action to be bypassed. In other words, if the user did not provide an input in furtherance of the predicted action and/or the input was not provided within a threshold period of time, the predicted action can be bypassed. Furthermore, the method 412 can proceed from the operation 422 the operation 402, via continuation element "B."

However, when the predicted action includes turning on the IoT kitchen lights and the user provides a spoken utterance such as, "Assistant, turn on my kitchen lights," the assistant can determine that the spoken utterance was in furtherance of a predicted action. When the user provides an input in furtherance of a predicted action, the method 412 can proceed from the operation 416 to the operation 418. The operation 418 can include causing the predicted action to be performed such that performance of the subtask of the predicted action is bypassed. In other words, because the subtask of the predicted action was previously performed, performance of the predicted action can include other subtasks, but can bypass the already performed subtask. For example, when the predicted action includes turning on the IoT kitchen lights, the subtask of generating a request that embodies a digital certificate can be bypassed when such request had already been generated and/or fulfilled. Therefore, this subtask can be bypassed and, in response to the input from the user, the request can be transmitted to the IoT kitchen lights, which can turn on the IoT kitchen lights without having to wait for the digital certificate to be retrieved and/or the request to be generated. This can therefore reduce latency that would otherwise be exhibited when performing additional subtasks. In some implementations, the method can proceed from the operation 418 to the operation 402, via continuation element "B."

Figure 5:
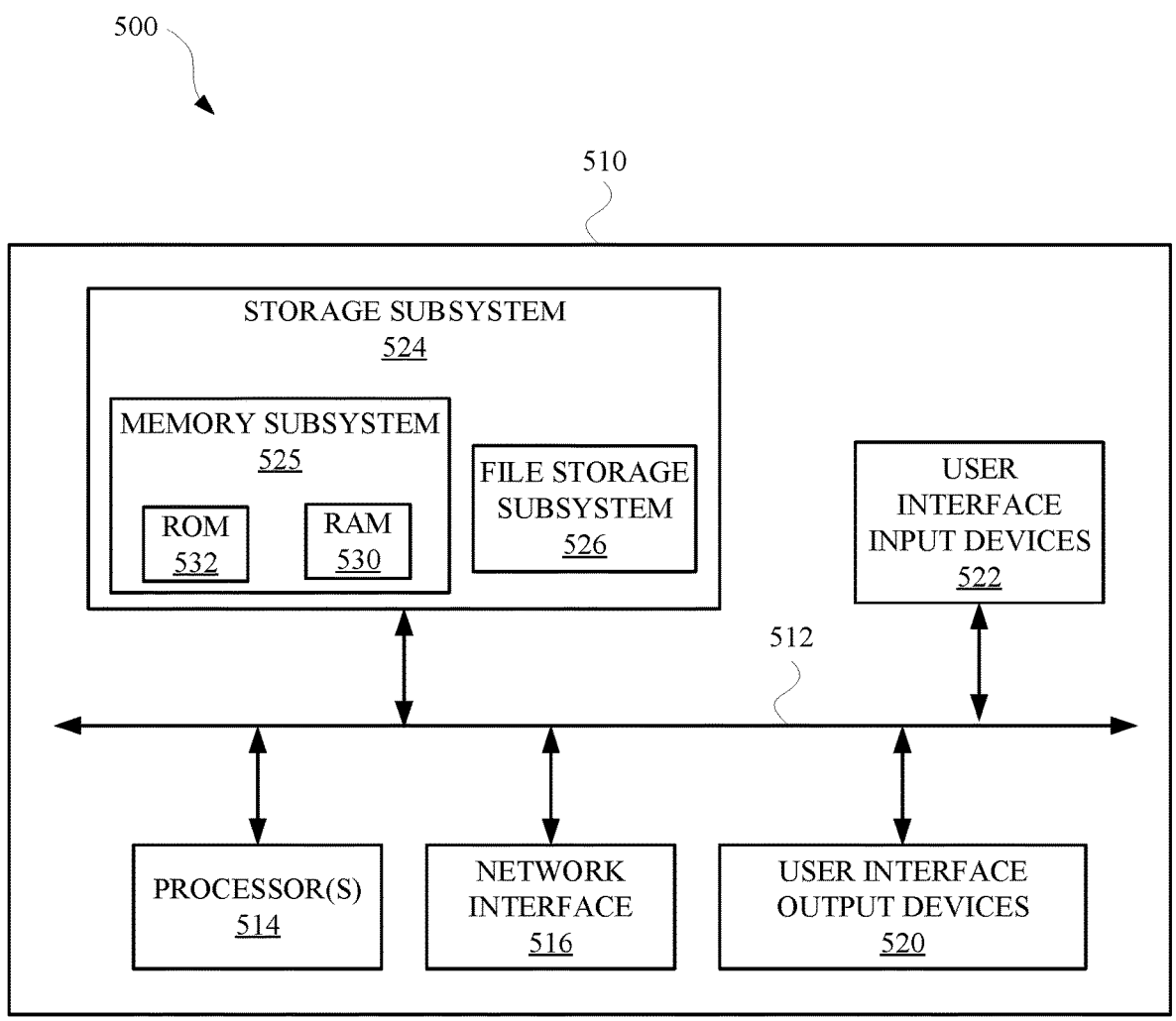
FIG. 5 is a block diagram of an example computer system.

FIG. 5 is a block diagram of an example computer system 510. Computer system 510 typically includes at least one processor 514 which communicates with a number of peripheral devices via bus subsystem 512. These peripheral devices may include a storage subsystem 524, including, for example, a memory 525 and a file storage subsystem 526, user interface output devices 520, user interface input devices 522, and a network interface subsystem 516. The input and output devices allow user interaction with computer system 510. Network interface subsystem 516 provides an interface to outside networks and is coupled to corresponding interface devices in other computer systems.

User interface input devices 522 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computer system 510 or onto a communication network.

User interface output devices 520 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 510 to the user or to another machine or computer system.

Storage subsystem 524 stores programming and data constructs that provide the functionality of some or all of the modules described herein. For example, the storage subsystem 524 may include the logic to perform selected aspects of method 400, and/or to implement one or more of system 300, computing device 102, computing device 202, third party server device 232, assistant server device 238, computing device 302, and/or any other application, device, apparatus, and/or module discussed herein.

These software modules are generally executed by processor 514 alone or in combination with other processors. Memory 525 used in the storage subsystem 524 can include a number of memories including a main random access memory (RAM) 530 for storage of instructions and data during program execution and a read only memory (ROM) 532 in which fixed instructions are stored. A file storage subsystem 526 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 526 in the storage subsystem 524, or in other machines accessible by the processor(s) 514.

Bus subsystem 512 provides a mechanism for letting the various components and subsystems of computer system 510 communicate with each other as intended. Although bus subsystem 512 is shown schematically as a single bus, alternative implementations of the bus subsystem may use multiple busses.

Computer system 510 can be of varying types including a workstation, server, computing cluster, blade server, server farm, or any other data processing system or computing device. Due to the ever-changing nature of computers and networks, the description of computer system 510 depicted in FIG. 5 is intended only as a specific example for purposes of illustrating some implementations. Many other configurations of computer system 510 are possible having more or fewer components than the computer system depicted in FIG. 5.

In situations in which the systems described herein collect personal information about users (or as often referred to herein, "participants"), or may make use of personal information, the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

In some implementations, a method is provided that includes determining, at a computing device that provides access to an automated assistant, that a user has provided a spoken utterance directed at the automated assistant, and generating, based on determining that the user has provided the spoken utterance, one or more action predictions corresponding one or more actions that are predicted to be initialized. Generating the one or more action predictions includes determining, for each respective action of the one or more actions, a probability that performance of the respective action of the one or more actions will be requested. The method further includes accessing, based on the one or more action predictions and prior to a user providing a subsequent input associated with the one or more actions, action advancement data corresponding to the one or more actions. The action advancement data corresponds to a type of data that is employed by the computing device and/or another computing device when performing a subtask in furtherance of performing a given action of the one or more actions. The method further includes performing, using the action advancement data, the subtask in furtherance of performing the given action of the one or more actions, determining, subsequent to or while performing the subtask, whether the user provided another input in furtherance of the given action of the one or more actions, and, when the user is determined to have provided the other input in furtherance of the given action, causing, in response to determining the other input was provided by the user, the given action of the one or more actions to be performed such that performance of the subtask of the given action is bypassed based on the subtask being previously performed.

These and other implementations of the technology may include one or more of the following features.

In some implementations, the action advancement data may include: device authentication data that is used when performing the given action to establish a connection between the computing device and a server device over a wide area network; and/or device connection data that is used when performing the given action to establish a connection between the computing device and a separate client device over a local area network.

In some implementations, an action prediction of the one or more action predictions may identify a probability that a user will request a corresponding action of the one or more actions. The probability that the user will request the corresponding action may be determined using a trained machine learning model.

In some implementations, the computing device may be a portable computing device, and generating the one or more action predictions may include processing, using the trained machine learning model, one or more inputs that include a location of the user and/or the portable computing device. In some of those implementations, the one or more inputs may characterize the computing device and/or another computing device via which the user is predicted to request performance of the given action of the one or more actions.

In some implementations, the method may further include, when the user is determined to have not provided the other input within a threshold period of time, causing a trained machine learning model to be modified in response to the user not providing the other input within the threshold period of time, and bypassing retrieving additional action advancement data in furtherance of completing one or more subtasks of the one or more actions. In some of those implementations, bypassing retrieving additional action advancement data may include actively dropping an HTTP connection between the computing device and a server device.

In some implementations, generating one or more action predictions corresponding to the one or more actions that the user is predicted to initialize performance may include determining, for each respective action of the one or more actions, an estimated computational obligation for the computing device to complete performance of the respective action. In some of those implementations, the estimated computational obligation may include an estimated time period for the computing device to complete performance of the respective action. Further, a longer estimated time period may be associated with a higher estimated computational load for the respective action.

In some of those implementations, the method may further include assigning, based on a particular estimated computational obligation determined for the given action, an expiration time for the user and/or another user to request performance of the given action. Further, the expiration time may correspond to a particular time after the user provided the spoken utterance. In some further implementations, the length of the assigned expiration time may be proportional to the estimated computational obligation determined for the given action.

In some implementations, generating the one or more action predictions corresponding to the one or more actions that the user is predicted to initialize performance of may include, determining, for each action prediction of the one or more action predictions, whether a total number of action predictions satisfies an action prediction threshold, and when the total number of action predictions satisfies the action prediction threshold, bypassing generating additional action predictions based on the total number of action predictions satisfying the prediction threshold. In some of those implementations, the action prediction threshold may be a dynamic value that is selected based on one or more characteristics of the computing device.

In some implementations, a method is provided that includes determining, at a computing device that provides access to an automated assistant, that a user has provided one or more inputs directed to the automated assistant to initialize performance of an available action, and generating, in response to determining that the user has provided the one or more inputs, one or more action predictions corresponding to one or more actions that are predicted to be initialized. The one or more action predictions are generated by at least processing, using a trained machine learning model, an input that identifies at least the available action that the user requested the automated assistant to initialize performance of. The method further includes accessing, based on the one or more action predictions and prior to the user providing a subsequent input corresponding to a request for performance of a given action of the one or more actions, action advancement data corresponding to the one or more actions. The action advancement data corresponds to a type of data that is employed by the computing device and/or another computing device when performing a subtask of the given action of the one or more actions. The method further includes causing the subtask of the given action of the one or more actions to be performed prior to the user providing the subsequent input to request performance of the given action of the one or more actions, determining, subsequent to determining that the user has provided the one or more inputs directed to the automated assistant, whether the user provided another input in furtherance of the computing device performing the given action of the one or more actions, and, when the user is determined to have provided the other input in furtherance of the given action, causing, in response to determining the other input was provided by the user, the given action of the one or more actions to be performed such that performance of the subtask of the action is bypassed based on the subtask being previously performed.

These and other implementations of the technology may include one or more of the following features.

In some implementations, the method may further include, when the user is determined to have provided the other input in furtherance of the given action, causing, in response to determining the other input was provided by the user, the trained machine learning model to be modified based on the user providing the other input that caused the given action to be performed. In some implementations, the method may further include, when the user is determined to have provided a particular input in furtherance of another action that is different from the given action, causing, in response to determining the particular input was provided by the user, the other action to be performed, and causing, in response to determining the particular input was provided by the user, the trained machine learning model to be modified based on the user providing the particular input that caused the other action to be performed.

In some implementations, the action advancement data may include device authentication data that is used when performing the given action to establish a connection between the computing device and a server device over a wide area network. In some additional or alternative implementations, the action advancement data may include device connection data that is used when performing the given action to establish a connection between the computing device and a client device over a local area network.

In some implementations, an action prediction of the one or more action predictions may identify a probability that the user will request a corresponding action of the one or more actions. Further, the probability that the user will request the corresponding action may be determined using the trained machine learning model. In some of those implementations, the computing device may be a portable computing device, and generating the one or more action predictions may include processing one or more inputs using a trained machine learning model, wherein the one or more inputs characterize a location of the user and/or the portable computing device.

In some of those implementations, generating the one or more action predictions may include processing one or more inputs using the trained machine learning model. Further, the one or more inputs characterize a type of computing device of the computing device and/or another computing device via which the user is predicted to request performance of the given action of the one or more actions.

In some further implementations, the method may further include when the user is determined to have not provided the other input within a threshold period of time, modifying a corresponding probability of at least one action of the one or more actions, and bypassing retrieving additional action advancement data in furtherance of completing one or more subtasks of the one or more actions. In some of those further implementations, bypassing retrieving additional action advancement data includes actively dropping an HTTP connection between the computing device and a server device.

In some implementations, generating one or more action predictions corresponding to that one or more actions that the user is predicted to initialize performance of may include determining, for each respective action of the one or more actions, an estimated computational obligation for the computing device to complete performance of the respective action. In some of those implementations, the estimated computational obligation may include an estimated time period for the computing device to complete performance of the respective action. Further, a longer estimated time period may be associated with a higher estimated computational load for the respective action.

In some of those implementations, the method may further include assigning, based on a particular estimated computational obligation determined for the given action, an expiration time for the user and/or another user to request performance of the given action. Further, the expiration time may correspond to a particular time after the user provided the spoken utterance. In some further implementations, the length of the assigned expiration time may be proportional to the estimated computational obligation determined for the given action.

In some implementations, generating the one or more action predictions corresponding to the one or more actions that the user is predicted to initialize performance of may include determining, for each action prediction of the one or more action predictions, whether a total number of action predictions satisfies an action prediction threshold, and, when the total number of action predictions satisfies the action prediction threshold, bypassing generating additional action predictions based on the total number of action predictions satisfying the prediction threshold. In some of those implementations, the action prediction threshold may be a dynamic value that is selected based on one or more characteristics of the computing device.

In some implementations, a method is provided that includes determining, at a computing device that provides access to an automated assistant, that a user has provided one or more inputs directed to the automated assistant to initialize performance of an available action, accessing, based on determining that the user provided the one or more inputs, contextual data that characterizes a context in which the user provided the one or more inputs to the computing device, and generating, in response to determining that the user has provided the one or more inputs, one or more action predictions corresponding to one or more actions that are predicted to be initialized. The one or more action predictions are generated by at least processing, using a trained machine learning model, an input that is based on at least the available action and the contextual data. The method further includes causing, based on the one or more action predictions, action advancement data to be cached at the computing device and/or another computing device. The action advancement data corresponds to a type of data that is employed by the computing device and/or the other computing device when performing one or more subtasks in furtherance of completing a given action of the one or more actions. The method further includes determining, based on the one or more inputs and/or the contextual data, an expiration for caching the action advancement data at the computing device and/or the other computing device, determining, subsequent to determining that the user has provided the one or more inputs directed to the automated assistant, whether the user, prior to the expiration for caching the advancement data, provided another input in furtherance of the computing device and/or the other computing device performing the given action of the one or more actions, and, when the user is determined to have provided the other input prior to the expiration for caching the advancement data and in furtherance of the given action of the one or more actions, causing, in response to determining the other input was provided by the user, the computing device and/or the other computing device to initialize performance of the given action of the one or more actions.

These and other implementations of the technology may include one or more of the following features.

In some implementations, the method may further include, when the user is determined to have provided the other input in furtherance of the given action, causing, in response to determining the other input was provided by the user, the trained machine learning model to be modified based on the user providing the other input that caused the action to be performed. In some of those implementations, the method may further include, when the user is determined to have provided a particular input in furtherance of another action that is different from the given action, causing, in response to determining the particular input was provided by the user, the other action to be performed, and causing, in response to determining the particular input was provided by the user, the trained machine learning model to be modified based on the user providing the particular input that caused the other action to be performed.

In some implementations, the action advancement data may include device authentication data that is used when performing the given action to establish a connection between the computing device and a server device over a wide area network. In some additional or alternative implementations, the action advancement data may include device connection data that is used when performing the given action to establish a connection between the computing device and a client device over a local area network.

In some of those implementations, an action prediction of the one or more action predictions may identify a probability that a corresponding action of the one or more actions will be requested. Further, the probability that the corresponding action will be requested may be determined using the trained machine learning model. In some further implementations, the computing device may be a portable computing device. Further, generating the one or more action predictions may include processing, using the trained machine learning model, one or more inputs that include a location of the user and/or the portable computing device. In some of those further implementations, generating the one or more action predictions may include applying the trained machine learning model to one or more inputs that include a type of computing device that characterizes the computing device and/or another computing device via which the user is predicted to request performance of the given action of the one or more actions.

In some implementations, generating the one or more action predictions corresponding to one or more actions that the user is predicted to initialize performance of may include determining, for each respective action of the one or more actions, an estimated computational obligation for the computing device to complete performance of the respective action. In some of those implementations, determining the expiration for caching the advancement data may be based on a particular estimated computational obligation determined for the given action.

In some implementations, generating the one or more action predictions corresponding the one or more actions that the user is predicted to initialize performance of may include determining, for each action prediction of the one or more action predictions, whether a total number of action predictions satisfies an action prediction threshold, and, when the total number of action predictions satisfies an the action prediction threshold, bypassing generating additional action predictions based on the total number of action predictions satisfying the prediction threshold. In some of those implementations, the action prediction threshold is a dynamic value that is selected based on one or more characteristics of the computing device.

Other implementations may include a non-transitory computer readable storage medium and/or a computer program storing instructions executable by one or more processors (e.g., central processing unit(s) (CPU(s)), graphics processing unit(s) (GPU(s)), and/or tensor processing unit(s) (TPU(s)) to perform a method such as one or more of the methods described above and/or elsewhere herein. Yet other implementations may include a system (e.g., a client device) having one or more processors operable to execute stored instructions to perform a method such as one or more of the methods described above and/or elsewhere herein.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

We claim:

1. A method implemented by one or more processors, the method comprising:
    determining, at a computing device that provides access to an automated assistant, that a user has provided a spoken utterance directed at the automated assistant;
    generating, based on determining that the user has provided the spoken utterance, one or more action predictions corresponding to one or more actions that are predicted to be initialized,
        wherein generating the one or more action predictions includes determining, for each respective action of the one or more actions, a probability that performance of the respective action of the one or more actions will be requested;
    accessing, based on the one or more action predictions and prior to a user providing a subsequent input associated with the one or more actions, action advancement data corresponding to the one or more actions,
        wherein the action advancement data corresponds to a type of data that is employed by the computing device and/or another computing device when performing a subtask of a given action of the one or more actions, and wherein the given action includes the subtask and other remaining subtasks;
    performing, using the action advancement data, the subtask of the given action of the one or more actions, wherein the subtask is in addition to any caching of the action advancement data;
    determining, subsequent to or while performing the subtask, whether the user provided another input in furtherance of the given action of the one or more actions; and
    when the user is determined to have provided the other input in furtherance of the given action:
        causing, in response to determining the other input was provided by the user, the other remaining subtasks of the given action of the one or more actions to be performed such that performance of the subtask of the given action is bypassed based on the subtask being previously performed.

2. The method of claim 1, wherein the action advancement data includes device authentication data that is used when performing the given action to establish a connection between the computing device and a server device over a wide area network.

3. The method of claim 1, wherein the action advancement data includes device connection data that is used when performing the given action to establish a connection between the computing device and a separate client device over a local area network.

4. The method of claim 1, further comprising:
    when the user is determined to have not provided the other input within a threshold period of time:
        causing a trained machine learning model to be modified in response to the user not providing the other input within the threshold period of time, and
        bypassing retrieving additional action advancement data in furtherance of completing one or more subtasks of the one or more actions.

5. The method of claim 4, wherein bypassing retrieving additional action advancement data comprises actively dropping an HTTP connection between the computing device and a server device.

6. The method of claim 1, wherein generating one or more action predictions corresponding to the one or more actions that the user is predicted to initialize performance of includes:
    determining, for each respective action of the one or more actions, an estimated computational obligation for the computing device to complete performance of the respective action.

7. The method of claim 6, wherein the estimated computational obligation comprises an estimated time period for the computing device to complete performance of the respective action, and wherein a longer estimated time period is associated with a higher estimated computational load for the respective action.

8. The method of claim 6, further comprising:
    assigning, based on a particular estimated computational obligation determined for the given action, an expiration time for the user and/or another user to request performance of the given action, wherein the expiration time corresponds to a particular time after the user provided the spoken utterance.

9. The method of claim 8, wherein the length of the assigned expiration time is proportional to the estimated computational obligation determined for the given action.

10. The method of claim 1, wherein generating the one or more action predictions corresponding to the one or more actions that the user is predicted to initialize performance of includes:

determining, for each action prediction of the one or more action predictions, whether a total number of action predictions satisfies an action prediction threshold, and when the total number of action predictions satisfies the action prediction threshold:

bypassing generating additional action predictions based on the total number of action predictions satisfying the prediction threshold.

11. A method implemented by one or more processors, the method comprising:

determining, at a computing device that provides access to an automated assistant, that a user has provided one or more inputs directed to the automated assistant to initialize performance of an available action;

generating, in response to determining that the user has provided the one or more inputs, one or more action predictions corresponding to one or more actions that are predicted to be initialized, wherein the one or more action predictions are generated by at least processing, using a trained machine learning model, an input that identifies at least the available action that the user requested the automated assistant to initialize performance of;

accessing, based on the one or more action predictions and prior to the user providing a subsequent input corresponding to a request for performance of a given action of the one or more actions, action advancement data corresponding to the one or more actions, wherein the action advancement data corresponds to a type of data that is employed by the computing device and/or another computing device when performing a subtask of the given action of the one or more actions, and wherein the given action includes the subtask and other remaining subtasks;

causing the subtask of the given action of the one or more actions to be performed prior to the user providing the subsequent input to request performance of the given action of the one or more actions, wherein the subtask is in addition to any caching of the action advancement data;

determining, subsequent to determining that the user has provided the one or more inputs directed to the automated assistant, whether the user provided another input in furtherance of the computing device performing the given action of the one or more actions; and when the user is determined to have provided the other input in furtherance of the given action:

causing, in response to determining the other input was provided by the user, the other remaining subtasks of the given action of the one or more actions to be performed such that performance of the subtask of the action is bypassed based on the subtask being previously performed.

12. The method of claim 11, further comprising:

when the user is determined to have provided the other input in furtherance of the given action:

causing, in response to determining the other input was provided by the user, the trained machine learning model to be modified based on the user providing the other input that caused the given action to be performed.

13. The method of claim 11, further comprising:

when the user is determined to have provided a particular input in furtherance of another action that is different from the given action:

causing, in response to determining the particular input was provided by the user, the other action to be performed, and causing, in response to determining the particular input was provided by the user, the trained machine learning model to be modified based on the user providing the particular input that caused the other action to be performed.

14. The method of claim 11, wherein an action prediction of the one or more action predictions identifies a probability that the user will request a corresponding action of the one or more actions, and wherein the probability that the user will request the corresponding action is determined using the trained machine learning model.

15. The method of claim 14, wherein generating the one or more action predictions includes processing one or more inputs using the trained machine learning model, wherein the one or more inputs characterize a type of computing device of the computing device and/or another computing device via which the user is predicted to request performance of the given action of the one or more actions.

16. The method of claim 14, further comprising:

when the user is determined to have not provided the other input within a threshold period of time:

modifying a corresponding probability of at least one action of the one or more actions, and bypassing retrieving additional action advancement data in furtherance of completing one or more subtasks of the one or more actions.

17. The method of claim 11, wherein generating one or more action predictions corresponding to that one or more actions that the user is predicted to initialize performance of includes:

determining, for each respective action of the one or more actions, an estimated computational obligation for the computing device to complete performance of the respective action.

18. The method of claim 17, wherein the estimated computational obligation comprises an estimated time period for the computing device to complete performance of the respective action, and wherein a longer estimated time period is associated with a higher estimated computational load for the respective action.

19. A method implemented by one or more processors, the method comprising:

determining, at a computing device that provides access to an automated assistant, that a user has provided one or more inputs directed to the automated assistant to initialize performance of an available action;

accessing, based on determining that the user provided the one or more inputs, contextual data that characterizes a context in which the user provided the one or more inputs to the computing device;

generating, in response to determining that the user has provided the one or more inputs, one or more action predictions corresponding to one or more actions that are predicted to be initialized, wherein the one or more action predictions are generated by at least processing, using a trained machine learning model, an input that is based on at least the available action and the contextual data;

causing, based on the one or more action predictions, action advancement data to be cached at the computing device and/or another computing device, wherein the action advancement data corresponds to a type of data that is employed by the computing device and/or the other computing device when performing one or more subtasks in furtherance of completing a given action of the one or more actions;

determining, based on an estimated computational obligation of the one or more subtasks, an expiration for caching the action advancement data at the computing device and/or the other computing device;

determining, subsequent to determining that the user has provided the one or more inputs directed to the automated assistant, whether the user, prior to the expiration for caching the action advancement data, provided another input in furtherance of the computing device and/or the other computing device performing the given action of the one or more actions; and when the user is determined to have provided the other input prior to the expiration for caching the action advancement data and in furtherance of the given action of the one or more actions:

causing, in response to determining the other input was provided by the user, the computing device and/or the other computing device to initialize performance of the given action of the one or more actions.

20. The method of claim 19, further comprising:

when the user is determined to have provided a particular input in furtherance of another action that is different from the given action:

causing, in response to determining the particular input was provided by the user, the other action to be performed, and causing, in response to determining the particular input was provided by the user, the trained machine learning model to be modified based on the user providing the particular input that caused the other action to be performed.

\* \* \* \* \*